(12) United States Patent
Lee

(10) Patent No.: US 11,301,185 B2
(45) Date of Patent: Apr. 12, 2022

(54) METHOD FOR MANAGING LOG GENERATED IN IMAGE FORMING APPARATUS

(71) Applicant: HEWLETT-PACKARD DEVELOPMENT COMPANY, L.P., Spring, TX (US)

(72) Inventor: Kwangwoo Lee, Gyeonggi-do (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/261,147

(22) PCT Filed: Jul. 23, 2019

(86) PCT No.: PCT/US2019/042970
§ 371 (c)(1),
(2) Date: Jan. 18, 2021

(87) PCT Pub. No.: WO2020/153988
PCT Pub. Date: Jul. 30, 2020

(65) Prior Publication Data
US 2021/0318841 A1 Oct. 14, 2021

(30) Foreign Application Priority Data
Jan. 24, 2019 (KR) .................. 10-2019-0009384

(51) Int. Cl.
*G06F 3/12* (2006.01)
*G06F 16/23* (2019.01)

(52) U.S. Cl.
CPC .......... *G06F 3/1232* (2013.01); *G06F 3/1273* (2013.01); *G06F 3/1293* (2013.01); *G06F 16/2365* (2019.01)

(58) Field of Classification Search
None
See application file for complete search history.

(56) References Cited

U.S. PATENT DOCUMENTS

| 9,405,901 B2 * | 8/2016 | Noda ................. G06F 21/552 |
| 10,785,243 B1 * | 9/2020 | Han .................... G06N 3/0445 |
| 2004/0131409 A1 | 7/2004 | Toedtli |
| 2005/0151991 A1 | 7/2005 | Shiraishi |
| 2007/0074028 A1 * | 3/2007 | Makishima ........... H04L 9/3263 713/176 |
| 2007/0223025 A1 * | 9/2007 | Hashizume ........ G06K 15/1849 358/1.13 |

(Continued)

FOREIGN PATENT DOCUMENTS

| WO | WO-0209019 | 1/2002 |
| WO | WO-0232047 | 4/2002 |

*Primary Examiner* — Henok Shiferaw
(74) *Attorney, Agent, or Firm* — Trop Pruner & Hu, P.C.

(57) ABSTRACT

An example image forming apparatus includes a communication device, a print engine to form an image, and a processor to, based on a first event in the image forming apparatus, generate first log data regarding the first event, generate first integrity inspection data regarding the first log data, generate a first signature value regarding the generated first integrity inspection data, and control the communication device to transmit the generated first log data, the first integrity inspection data and the first signature value to a server device.

19 Claims, 8 Drawing Sheets

(56) References Cited

U.S. PATENT DOCUMENTS

| | | | |
|---|---|---|---|
| 2008/0098232 A1* | 4/2008 | Miyazaki | H04L 9/321 |
| | | | 713/176 |
| 2009/0089592 A1* | 4/2009 | Kudo | H04L 9/3236 |
| | | | 713/193 |
| 2009/0237726 A1* | 9/2009 | Fujisawa | H04N 1/2166 |
| | | | 358/1.15 |
| 2009/0260069 A1* | 10/2009 | Nakajima | H04L 9/321 |
| | | | 726/7 |
| 2009/0268259 A1 | 10/2009 | Kikuchi | |
| 2012/0218587 A1* | 8/2012 | Koike | H04N 1/00 |
| | | | 358/1.14 |
| 2013/0038902 A1* | 2/2013 | Sato | G06F 3/129 |
| | | | 358/1.15 |
| 2014/0146356 A1 | 5/2014 | Hirahara | |
| 2020/0177753 A1* | 6/2020 | Kubo | H04N 1/2166 |

* cited by examiner

FIG. 6

[Sequence Number | Log Server IDs | IID GUID | Time | Event Message | Hash
(Sequence Number | Log Server IDs | IID GUID | Time | Event Message) | Sigh (Hash
(Sequence Number | Log Server IDs | IID GUID | Time | Event Message)) | Previous Hash value | Sigh
(Hash (Sequence Number | Log Server IDs | IID GUID | Time | Event Message) | Previous Hash value)]

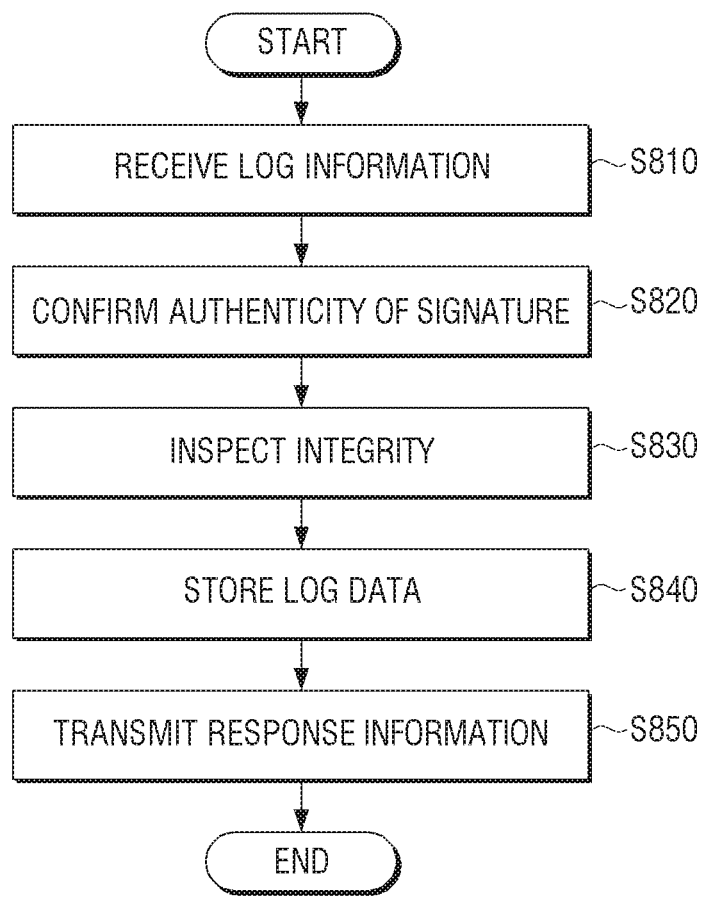

METHOD FOR MANAGING LOG GENERATED IN IMAGE FORMING APPARATUS

BACKGROUND

An image forming apparatus refers to an apparatus that prints out print data generated in a print control terminal apparatus such as a computer on a printing paper. Examples of an image forming apparatus include a copier, a printer, a scanner, a facsimile, or a multi-function peripheral (MFP) in which the above functions are combined and implemented by a single apparatus.

Recently, an image forming apparatus stores a log to record an operation, authentication, etc. performed in the apparatus.

BRIEF DESCRIPTION OF THE DRAWINGS

Various examples will be described below by referring to the following figures:

FIG. 6 is a view illustrating log information according to an example;

FIG. 8 is a flowchart illustrating a log management method in a server device according to an example.

DETAILED DESCRIPTION

Hereinafter various examples will be described with reference to the drawings. The examples described below may be modified in various forms. In order to describe the features of the examples more clearly, a detailed description of components or features well-known to those skilled in the art may be omitted.

The term "connected to" or "coupled to" that is used to designate a connection or coupling of one element to another element includes both a case that the element is directly connected or coupled to the other element and a case that the element is connected or coupled to the other element via still another element. Further, the term "includes" means that other constituent elements may be further included rather than excluding the other constituent elements unless specially mentioned or described to the contrary.

In the disclosure, an "image forming job" may refer to any of various operations (e.g., copying, printing, scanning, or a facsimile operation) related to an image such as forming an image or generating/storing/transmitting an image file, and a "job" may refer to a series of processes required for performing the image forming job, in addition to the image forming job.

In addition, an "image forming apparatus" may refer to a device that prints print data that is generated from a terminal device, such as a computer, on a recording medium such as paper. Examples of an image forming apparatus may be a copier, a printer, a scanner, a facsimile, or a multi-function printer (MFP) that has multiple functions of the above-described devices in one unit.

Further, the term "print data" may refer to data that is converted into a format printable in a printer. On the other hand, if the printer supports direct printing, the file itself may be the print data.

Further, the term "user" may refer to a person who performs an operation related to an image forming job using an image forming apparatus or a device that is connected to the image forming apparatus in a wired or wireless manner. Further, the term "manager" may refer to a person who has the right to access all functions and systems of the image forming apparatus. The "manager" and the "user" may be the same person.

Figure 1:
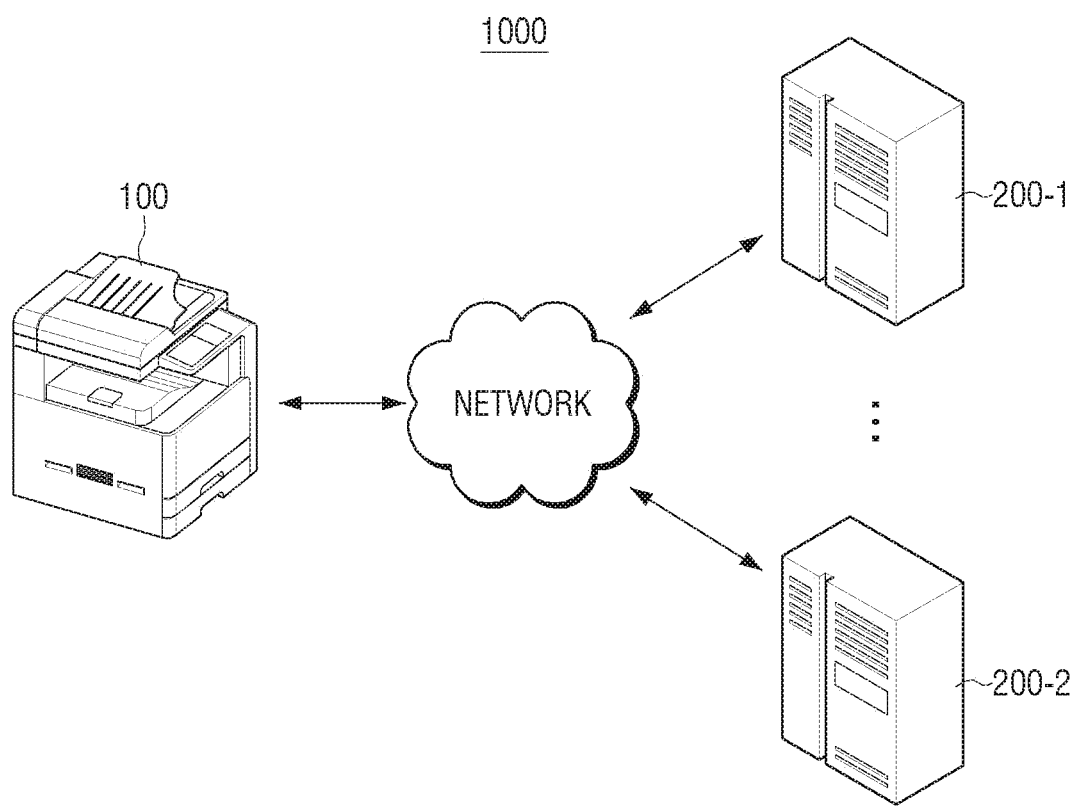
FIG. 1 is a view illustrating a configuration of an image forming system according to an example.

FIG. 1 is a view illustrating a configuration of an image forming apparatus according to an example.

Referring to FIG. 1, an image forming system 1000 may include an image forming apparatus 100 and a plurality of server devices 200 (e.g., a first server device 200-1, a second server device 200-2, etc.).

The image forming apparatus 100 performs an operation according to a user request and generates log data corresponding to an event generated in the image forming apparatus 100. In an example, the log data may include an event message which includes information on the generated event, and may further include a sequence number, a server identifier, identification information of the image forming apparatus 100, time information, and the like. The sequence number includes an intrinsic number assigned to identify the generated event, the server identifier (e.g., log server IDs) includes identification information corresponding to the information for identifying a server (or a server group) which is to receive the generated log data, and the identification information (e.g., ID GUID) of the image forming apparatus 100 includes intrinsic information of the image forming apparatus 100 and may be, for example, a serial number, media access control (MAC) information, etc. of the image forming apparatus 100. Such log data has a structure in which the above described information such as an event message, a sequence number, etc. are concatenated.

The image forming apparatus 100 may generate integrity inspection data corresponding to the generated log data and a signature value regarding the integrity inspection data and may transmit the log information having the generated log data, the integrity inspection data, and the signature value to one or more of the plurality of server devices 200-1 and 200-2.

In an example, the integrity inspection data includes data for inspecting the integrity of the log data, and may be a result value generated by performing a logical operation of the log data (i.e., a hash value regarding log data), a result value generated by applying a predetermined calculation to the log data, or an encryption result value generated by encrypting data. For example, the integrity inspection data may be calculated using Equation 1 below.

$$\text{First integrity inspection data} = E(\text{Sequence Number} | \text{Log server IDs} | \text{ID GUID} | \text{TIME} | \text{Event Message}) \quad \text{Equation 1}$$

In Equation 1, E( ) refers to a function that determines a result value by applying a predetermined equation. As in the above, the integrity inspection data may be generated as a result value calculated by applying various logical operations such as sum up, eXclusive OR (XOR), etc. to previous integrity inspection data and data to be transmitted, or by substituting data to the equation which is publicly known, between the image forming apparatus 100 and the server device 200, a result value encrypted by applying the above described various encryption algorithm, or the like.

The signature value includes a value for demonstrating the fact that the generated integrity inspection data is written in the image forming apparatus 100 and the fact that the generated integrity inspection data is not modulated in the transmitting/receiving process. In an example, the signature value may be generated as a signature key (or a personal key).

Here, the signature key may include a key used for signing regarding the integrity inspection data and may be referred to as a secret key. In addition, a verification key may include a key for verifying the generated signature and may be referred to as a public key. The signature key may include a key used for encrypting (or encoding) a message.

The image forming apparatus 100 may transmit log information to only one of the plurality of server devices 200-1 and 200-2, or may transmit log information to the plurality of server devices 200-1 and 200-2. For example, to store and manage the generated log information stably, the image forming apparatus 100 may let each of the plurality of server devices 200-1 and 200-2 store log information of the image forming apparatus 100 at the same time.

In addition, the image forming apparatus 100 may transmit access address information regarding the plurality of server devices 200-1 and 200-2 to each of the plurality of server devices 200-1 and 200-2. According thereto, the plurality of server devices 200-1 and 200-2 may confirm information of another server device that operates together and may perform a log management operation such as confirming whether there is omitted log information, through a mutual communication. Here, the access address information may include address information (e.g., an internet protocol (IP) address, a uniform resource identifier (URI) address, etc.) required for accessing each of the plurality of server devices 200-1 and 200-2 managing log information of the image forming apparatus 100.

Each of the plurality of server devices 200-1 and 200-2 may confirm whether log data in the log information received from the image forming apparatus 100 is not falsified in the transmitting and receiving process and confirm the integrity. For example, each of the plurality of server devices 200-1 and 200-2 may verify authenticity of the integrity inspection data using a signature value in the log information and a verification key already known.

Each of the plurality of server devices 200-1 and 200-2 may inspect the integrity of the integrity inspection data if the authenticity of the signature is confirmed. For example, each of the plurality of server devices 200-1 and 200-2 may generate the integrity inspection data regarding the log data using the log data included in the log information, compare the generated integrity inspection data and the integrity inspection data in the log information, and inspect the integrity based on whether the two pieces of integrity inspection data correspond to each other (e.g., are the same).

As a result of the comparison, if the integrity of the log data is confirmed, the plurality of server devices 200-1 and 200-2 may store the log data in the log information. In addition, each of the plurality of server devices 200-1 and 200-2 may transmit response information that the log information is stored to the image forming apparatus 100. If a falsification is confirmed or integrity is not confirmed in the process of confirming the signature value or inspecting the integrity, each of the plurality of server devices 200-1 and 200-2 may transmit the response information indicating the failure of the reception to the image forming apparatus 100.

In addition, each of the plurality of server devices 200-1 and 200-2 may manage the log information by preparing a log list regarding stored log information and comparing mutual log lists.

The image forming system 1000 according to an example manages log information of the image forming apparatus 100 by storing the log information in an external server device 200, and thus, it is possible to store and maintain the log information in the image forming apparatus 100 continuously regardless of the storage space of the image forming apparatus 100. In addition, the log information of the image forming apparatus 100 may be managed by using a plurality of server devices 200-1 and 200-2, and thus, the information may be reliably stored. In addition, in the transmission process of log information, the integrity inspection value is transmitted together with a signature value and thus various problems that may occur in the communication process such as a communication error, a communication blocking, or a loss of a network packet in the process of transmitting log information may be addressed.

In the example of FIG. 1, it has been described that log information is configured by using log data, integrity inspection data, and a signature value. However, this is merely an example. In other examples, it is possible that log information is composed using the integrity inspection data regarding previous log data. Such an example will be described later with reference to FIG. 6.

In the example of FIG. 1, it has been described that there are two server devices 200-1 and 200-2. However, this is merely an example. In other examples, it may be implemented as a form in which three or more than three server devices share log information at the same time, and a form in which only one server device is used.

In the example of FIG. 1, it has been described that the server device confirms the integrity after confirming authenticity using a signature. However, this is merely an example. In other examples, the authenticity may be confirmed after the integrity is verified and the confirmation of the authenticity and integrity may be performed at the same time.

Figure 2:
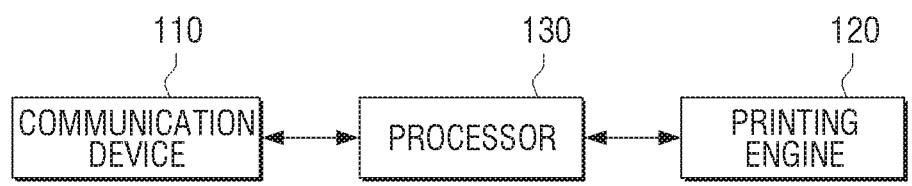
FIG. 2 is a block diagram illustrating a configuration of an image forming apparatus according to an example.

FIG. 2 is a block diagram illustrating a configuration of an image forming apparatus according to an example.

Referring to FIG. 2, the image forming apparatus 100 may include a communication device 110, a printing engine 120, and a processor 130.

The communication device 110 may connect the image forming apparatus 100 to an external apparatus (not illustrated), and may be connected to the external apparatus through not only a local area network (LAN), the Internet, or the like but also a universal serial bus (USB) port, a wireless communication (e.g., Wi-Fi 802.11a/b/g/n, a near field communication (NFC), or Bluetooth) port, or the like. The communication device 110 may be referred to as a transceiver.

The communication device 110 may transmit the generated log information to the server devices 200-1 and 200-2. In response thereto, the communication device 110 may receive response information from the server devices 200-1 and 200-2. The response information may include a success message that indicates a success of a reception or a failure message that indicates a failure of a reception. The response information may include a signature value that indicates an authenticity of the success message or the failure message. The signature value included in the response information may include a value for determining whether the response data is modulated.

The communication device 110 may receive printing data and a printing command from a print control terminal apparatus (not illustrated).

The printing engine 120 may form an image. For example, the printing engine 120 may print a printing image generated in the processor 130 on a printing medium such as paper. The printing engine 120 may perform printing in an electrophotographic method, an inkjet method, or the like. In addition, the printing engine 120 may be a mono printing engine which can print only one color and may be a color printing engine which can perform a color printing in more than one color.

The processor 130 may control each unit within the image forming apparatus 100. For example, the processor 130 may control the printing engine 120 to print the received printing data when the printing data is received from the printing control terminal (not illustrated).

The processor 130 may be composed of a single device such as a central processing unit (CPU), or composed of a plurality of devices such as a clock generation circuit, a CPU, a graphic processor, etc.

The processor 130 may generate log data in response to the above described printing operation. In addition, the processor 130 may store the generated log data in a memory. In an example, the log data may be generated not only regarding the performing of a predetermined function by the image forming apparatus 100 but also when an event such as a user authentication, a change of a system setting, a change of a security setting, etc. is generated.

The processor 130 may determine whether a transmission of log data is required. For example, the processor 130 may confirm whether a predetermined period is reached or whether an amount of generated log data is equal to or more than a predetermined amount, and determine whether the transmission of the log data is required.

If the transmission of the log data is required, the processor 130 may generate log information regarding each piece of log data. For example, the processor 130 may generate integrity inspection data regarding the log data, generate a signature value regarding the generated integrity inspection data, and generate log information by concatenating the log data, the integrity inspection data, and the signature value.

In order to avoid an arbitrary event from being added between the log data, the processor 130 may form a hash chain between the log data. For example, the processor 130 may generate integrity inspection data (hereinafter referred to as the second integrity inspection data) regarding previous log data (hereinafter referred to as the second log data) generated before log data (hereinafter referred to as the first log data), and a signature value (hereinafter referred to as the second signature value) regarding the integrity inspection data (hereinafter referred to as the first integrity inspection data) regarding the first log data, and may transmit the generated second integrity inspection data and the second signature value to the server device 200 together with the previously generated first integrity inspection data and the first signature value. That is, the processor 130 may generate log information by concatenating the log data, the first integrity inspection data, the first signature value, the second integrity inspection data, and the second signature value. An example of such concatenation is illustrated in FIG. 6.

When the log information is generated, the processor 130 may control the communication device 110 to transmit the generated log information to the server device 200. Here, the processor 130 may control the communication device 110 so that the log information is transmitted to a plurality of server devices (e.g., 200-1 and 200-2).

If response information is not received in response to the transmission of the log information or response information including failure data is received, the processor 130 may control the communication device 110 to re-transmit the log information. In an example, if response information is not received in response to the transmission of the log information or response information including failure data is received, the processor 130 may restrict an operation of the printing engine 120.

An example of a configuration of an image forming apparatus has been described above. However, various configurations may be additionally provided. Examples of other various configurations will be described below with reference to FIG. 3.

Figure 3:
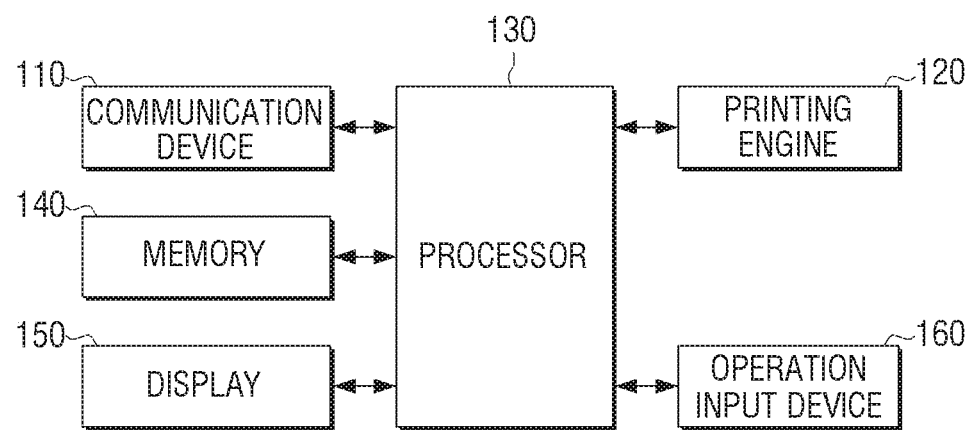
FIG. 3 is a block diagram illustrating a configuration of an image forming apparatus according to an example.

FIG. 3 is a block diagram illustrating a configuration of an image forming apparatus according to an example.

Referring to FIG. 3, the image forming apparatus 100 may include the communication device 110, the printing engine 120, the processor 130, a memory 140, a display 150, and an operation input device 160.

The communication device 110 and the printing engine 120 have been described with reference to FIG. 2, and thus, a duplicated description will be omitted. In addition, the processor 130 has been described with reference to FIG. 2, and thus, a duplicated description illustrated in FIG. 2 will be omitted and only the configuration added to FIG. 3 will be described below.

The memory 140 may store a program for driving the image forming apparatus 100. In addition, the memory 140 may store received printing data.

The memory 140 may store information on a log generated in the image forming apparatus 100, that is, log data (or log information).

The memory 140 may be implemented as a storage medium in the image forming apparatus 100 or an external storage medium, for example, a removable disk including a USB memory, a web server through a network, etc.

The display 150 may display a user interface window to obtain a selection of a function supported by the image forming apparatus 100. For example, the display 150 may display a user interface window for obtaining a selection of various functions provided by the image forming apparatus 100. The display 150 may be a monitor such as liquid crystal display (LCD), a cathode-ray tube (CRT), a light emitting diode (LED), an organic LED (OLED), etc. and may be implemented as a touch screen that may simultaneously perform the function of the operation input device 160 to be described later.

The display 150 may display a user interface window for obtaining a setting of a log management method from a user or a manager. Here, the user interface window may include a region in which information on a main server device (e.g., a server address, a server protocol, a server port, a maximum number of messages, a priority order, server authentication information (ID/PW, token), etc.) is set, a region in which information on an auxiliary server device is set, and a region in which a log management method (e.g., whether consistency is verified, processing method when there is an error, etc.) is selected.

In addition, the display 150 may display an error message regarding a case in which an error is generated in a communication process with the server device 200, a log transmission is impossible, or the like.

The operation input device 160 may receive a selection of a function and a control command regarding the corresponding function from a user. Here, the function may include printing, copying, scanning, fax transmission, and the like. The function control command as described above may be input through a control menu displayed on the display 150.

In addition, the operation input device 160 may receive information on the log management method and a server device from a user or a manager.

If a response message is received from the server device 200, the processor 130 may manage the log data stored in the memory in response to the received response message. For example, if response information including a success message which indicates that the reception has succeeded is received, the processor 130 may delete the log data (or log information) corresponding to the response information from the memory 140.

If the response information including the failure message is received from the server device 200 or the response information is not received for a first time which is predetermined, the processor 130 may postpone the deletion of the stored log data and control the communication device 110 to transmit the same log information again. Also, if the response information including the failure message is received from the server device 200 or the response information is not received for the first time which is predetermined, the processor 130 may restrict an operation of the printing engine 120.

In an example, if the failure message is repeatedly received more than a predetermined number of times or the response information is not received for a second time which is longer than the first time, the processor 130 may perform an additional operation such as informing of this problematic situation to a manager, stopping the system and displaying that there is an error, rebooting the system, or the like.

The image forming apparatus 100 may manage log information of the image forming apparatus 100 by storing the log information in an external server device 200, and thus, it is possible to store and manage the log information in the image forming apparatus 100 continuously regardless of the storage space of the image forming apparatus 100. In addition, the log information may be provided to a plurality of server devices 200, and thus, the information may be reliably stored. The integrity inspection may be transmitted together with the signature value in the transmission process of the log information, and thus, various problems that may be generated in the communication process, such as a network communication error, a blocking of communication, an omission of a packet, etc. may be addressed.

When illustrating and describing FIG. 2 and FIG. 3, it has been described that the image forming apparatus 100 stores log data and transmits the log data periodically or after more than a predetermined amount of log data is accumulated. However, these are only examples. In other examples, the load information corresponding to the log data may be generated and transmitted immediately whenever an event occurs.

Figure 4:
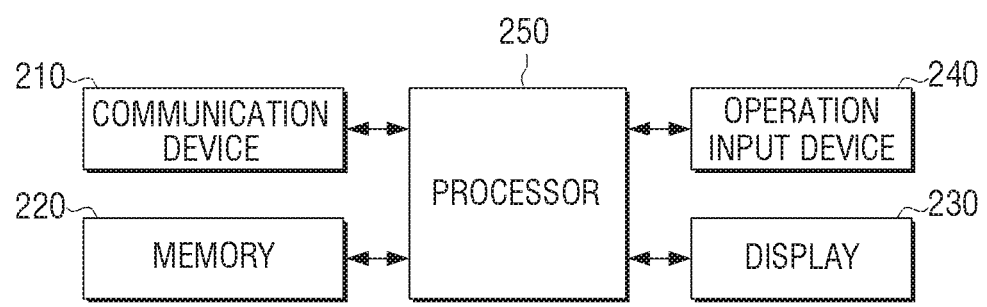
FIG. 4 is a block diagram illustrating a server device according to an example.

FIG. 4 is a block diagram illustrating a server according to an example.

Referring to FIG. 4, the server device 200 may be composed of a communication device 210, a memory 220, a display 230, an operation input device 240, and a processor 250.

The communication device 210 may connect the server device 200 to an external apparatus, and may be connected to the image forming apparatus 100 through not only a LAN, the Internet, or the like but also a USB port, a wireless communication (e.g., Wi-Fi 802.11a/b/g/n, NFC, or Bluetooth) port, or the like. The communication device 210 may be referred to as a transceiver.

The communication device 210 may receive log information from the image forming apparatus 100. In addition, the communication device 210 may transmit response information regarding the received log information to the image forming apparatus 100.

The communication device 210 may exchange a log list with another server device and transmit the log information stored according thereto to another server device or receive the log information stored in the other server device from the other server device.

The memory 220 may store a program for driving the server device 200. In addition, the memory 220 may store the received log information. For example, the memory 220 may store the log information (or log data) for each image forming apparatus in a form of a database. Here, in order to reduce the storage capacity, only the information that is variable according to an event of an image forming apparatus, such as a sequence number, an event message, time information, and the like may be stored from among the log data.

The memory 220 may store information on a verification key corresponding to a signature key. The memory 220 may be implemented as a storage medium in the server device 200 or as an external storage medium, for example, a removable disk including a USB memory, a web server via a network, and the like.

The display 230 may display a user interface window to obtain a selection of a function supported by the server device 200. The display 230 may be a monitor such as an LCD, a CRT, an LED, an OLED, etc. and may be implemented as a touch screen that may simultaneously perform a function of an operation input device 240 to be described later.

The operation input device 240 may receive the setting of a management method regarding log information. The management method may be received through the communication device 210 and received through a user interface window.

The processor 250 may control each configuration in the server device 200. For example, if log information is received from the image forming apparatus 100, the processor 250 may verify an authenticity of the integrity inspection data in the received log information using the signature value in the log information and a pre-stored verification key.

If the authenticity of the signature is confirmed, an integrity of the integrity inspection data may be inspected. For example, the processor 250 may generate the integrity inspection data using the log data included in the log information, compare the generated integrity inspection data and the integrity inspection data included in the log information, and inspect the integrity of the log data based on whether two pieces of integrity inspection data are the same.

As a result of the comparison, if the integrity of the log data is confirmed, the processor 250 may store the log data in the log information in the memory 220.

If the image forming apparatus 100 transmits log information including second integrity inspection data and a second signature value, the processor 250 may verify the authenticity of the second integrity inspection data through the second signature value and whether the first log data is the data following the second log data.

In an example, the image forming apparatus 100 may transmit the plurality of pieces of log data sequentially, and the plurality of pieces of log data may be received in an order different from the order of transmission according to the communication status. In consideration of the above, the processor 250 may confirm the sequence number. If a difference between the sequence number of the received log information and the sequence number of the log information previously received is greater than a threshold, the processor 250 may postpone the verification of the signature value and proceed with the verification.

The processor 250 may generate response information that the log information is stored in the image forming apparatus 100 and control the communication device 210 to transmit the generated response information.

For example, if there is no problem in the received log information, the processor 250 may transmit the response information in which a success indicator indicating the success of a reception, a sequence number, a server identifier (Log Server IDs), an identification number of an image forming apparatus (IID GUID), and a signature value (a success indicator, a sequence number, a server identifier, identification information of an image forming apparatus) are concatenated.

On the contrary, if there is a problem in the received log information, the processor 250 may transmit the response information in which a failure indicator indicating the failure of a reception, a sequence number, a server identifier (Log Server IDs), an identification number of an image forming apparatus (IID GUID), and a signature value (a failure indicator, a sequence number, a server identifier, identification information of an image forming apparatus) are concatenated.

If access address information is received from the image forming apparatus 100, the processor 250 may transmit a log list or request to transmit the log list to another server device 200-2 using access address information of the other server device 200-2 in the access address information. In that case, the processor 250 may compare and manage the log lists of two server devices.

If an omission is confirmed in the comparison process, the processor 250 may request another server device to transmit the omitted log or transmit the log data omitted from the other server device. Here, the processor 250 may generate the integrity inspection data and a signature value regarding the log data to be transmitted and control the communication device 210 to transmit the integrity data and the signature value together with the log data to the other server device.

The server device 200 according to an example manages log information of the image forming apparatus 100 by storing the log information in the server device 200, and thus, it is possible to store and maintain the log information in the image forming apparatus 100 continuously regardless of the storage space of the image forming apparatus 100. In addition, the log information of the image forming apparatus 100 is managed by using the plurality of server devices 200, and thus, the information may be reliably stored.

Figure 5:
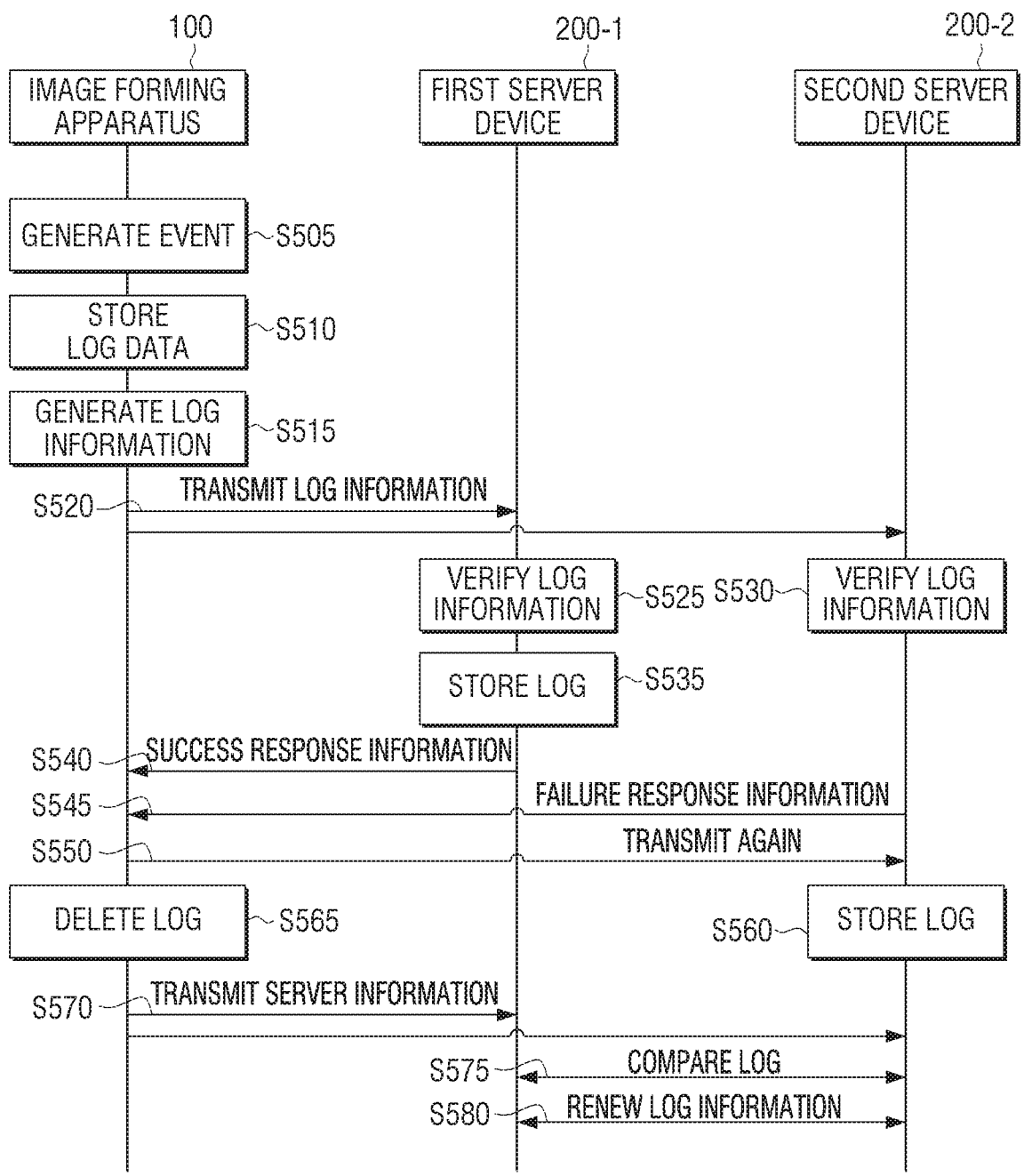
FIG. 5 is a sequence view illustrating a log management method according to an example.

FIG. 5 is a sequence view illustrating a log management method according to an example.

Referring to FIG. 5, the image forming apparatus 100 performs an operation according to a user request and generates log data corresponding to a generated event in operation S505. The generated log data is stored in the image forming apparatus 100 in operation S510.

If the log data is to be transmitted, the image forming apparatus 100 may generate integrity inspection data regarding the log data and a signature value regarding the integrity inspection data, and generate log information including the log data, the integrity inspection data, and the signature value, in operation S515. In an example, to form a chain of the log data, the second integrity inspection data regarding the previous log data may be included in the log information together with the second signature value which is a signature value of two pieces of integrity inspection data.

If log information is generated, the image forming apparatus 100 may transmit the log information to each of the first server device 200-1, which is a predetermined main server device, and the second server device 200-2, which is an auxiliary server device in operation S520.

The first server device 200-1 that receives the log information may verify the received log information. In an example, the first server device 200-1 may verify the authenticity and integrity of the log information in operation S525. If there is no problem, the first server device 200-1 may store the log data in the received log information in operation S535. In addition, the first server device 200-1 may transmit response information indicating there is no problem in the received log information to the image forming apparatus 100 in operation S540.

The second server device 200-2 may verify the received log information in the same way as the first server device 200-1 in operation S530. If an error occurs in the verification process, the second server device 200-2 may transmit response information indicating that there is a problem in the log information of the image forming apparatus 100 without storing the received log data in operation S545. In addition, the second server device 200-2 may receive the log information again from the image forming apparatus 100 in response thereto in operation S550. If there is no problem in the log information received again, the second server device 200-2 may store the log data in the received log information in operation S560. Although it is not illustrated in FIG. 5, the response information informing that the reception of the log data has succeeded may be transmitted to the image forming apparatus 100.

The image forming apparatus 100 that receives response information indicating the success may delete predetermined log data corresponding to the response information in operation S565. Here, the image forming apparatus 100 may delete pre-stored log data if the response information including a success indicator is received from all server devices 200-1 and 200-2, and may delete the pre-stored log data if the response information including the success indicator is received from at least one of the server devices.

In addition, the image forming apparatus 100 may transmit mutual server information to each of the server devices 200-1 and 200-2 in operation S570. Each server device 200-1 and 200-2 that receives the server information may compare mutual log lists in operation S575 and if there is a difference, renew mutual log information and maintain the log data stored in two devices to be the same, in operation S580.

As in the above example, log information is updated through the communication between the server devices 200-1 and 200-2, and thus, the log information may be managed reliably.

FIG. 6 is a view illustrating log information according to an example.

Referring to FIG. 6, the illustrated symbol "|" means a concatenation of data. Accordingly, the log information may have a structure in which a sequence number, a server identifier (e.g., Log Server IDs), identification information (e.g., ID GUID) of the image forming apparatus 100, time, an event message, first integrity inspection data, a first signature value, second integrity inspection data, and a second signature value are concatenated. In addition, the first integrity inspection data may include a value generated by hashing a sequence number, a server identifier (Log Server IDs), identification information (ID GUID) of the image forming apparatus 100, time, and an event message, the first signature value may include a signature value regarding the first integrity inspection value, the second integrity inspection data may include integrity inspection data regarding a previous event, and the second signature value may include a signature value regarding the first integrity inspection data and the second integrity inspection data.

In an example, other data may be added in addition to the above described data, and one of the above described value may be omitted. In an example, log data may be encrypted and integrity inspection data and a signature value regarding the encrypted log data may be used.

Figure 7:
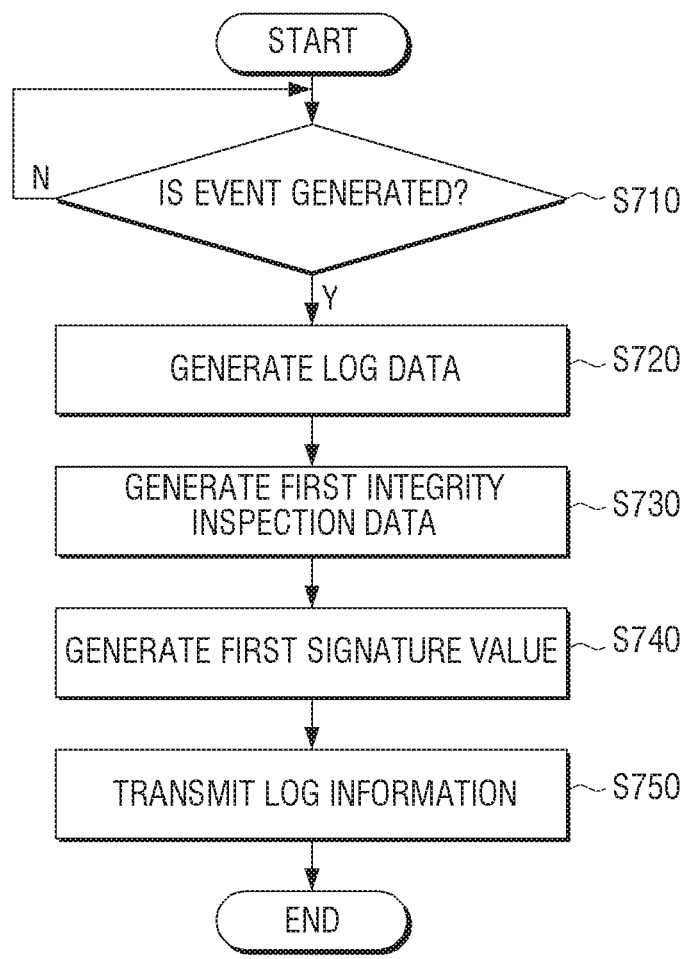
FIG. 7 is a flowchart illustrating a log transmission operation according to an example.

FIG. 7 is a flowchart illustrating a log transmission operation according to an example.

Referring to FIG. 7, if a predetermined event is generated in an image forming apparatus in operation S710, first log data regarding the event is generated in operation S720. Here, the generated first log data may be stored in a memory. In an example, the log data may be generated not only regarding performing of a predetermined function of the image forming apparatus, but also when an event such as a user authentication, a change of system setting, a change of security setting, etc. is generated.

First integrity inspection data regarding the first log data is generated in operation S730. For example, the first integrity inspection data may be generated by logically calculating log data or applying a predetermined equation.

A first signature value regarding the generated first integrity inspection data is generated in operation S740. For example, a first signature value can be generated by using the first integrity inspection data and a pre-stored signature key. If a hash chain is generated, a second signature value regarding the pre-stored second integrity inspection data and the first integrity inspection data may be generated.

The generated first log data, the first integrity inspection data and the first signature value are transmitted to the pre-registered server device in operation S750. For example, log information may be generated by concatenating the first log data, the first integrity inspection data, and the first signature value, and the generated log information may be transmitted to a server device. The log information may be transmitted to a plurality of server devices repeatedly.

If a hash chain is formed, the log information in which the first log data, the first integrity inspection data, and the first signature value, the second integrity inspection data, and the second signature value are concatenated is generated, and the generated log information may be transmitted.

If response information indicating the completion of reception of the first log data is received from the server device, the first log data stored in the memory may be deleted.

FIG. 8 is a flowchart illustrating a log management method in a server device according to an example.

Referring to FIG. 8, if log information is received from an image forming apparatus in operation S810, the server device may verify an authenticity of integrity inspection data in the received log information using a signature value in the log information and a pre-stored verification key in operation S820.

If the authenticity of the signature is confirmed, the integrity of the integrity inspection data may be inspected in operation S830. For example, the server device 200 may generate the integrity inspection data using the log data included in the log information, compare the generated integrity inspection data and the integrity inspection data included in the log information, and inspect the integrity of the integrity inspection data based on whether the two pieces of integrity inspection data correspond to each other (e.g., are the same).

As a result of the comparison, if the integrity of the log data is confirmed, the log data in the log information may be stored in operation S840. The server device may generate response information that the log information is stored in the image forming apparatus and transmit the generated response information to the image forming apparatus 100 in operation S850.

In the examples of log management methods as illustrated in FIG. 7 and FIG. 8, the log information of the image forming apparatus is stored in the server device and managed. Thus, it is possible that the log information in the image forming apparatus 100 is stored and managed continuously regardless of the storage space of the image forming apparatus 100. In addition, the log information of the image forming apparatus may be managed by using a plurality of server devices, and thus, the information may be reliably stored.

The examples of log management methods in FIG. 7 and FIG. 8 may be implemented as a program. As an example, a program including a log management method may be stored in a non-transitory computer readable medium and provided therein.

The non-transitory computer readable medium is not a medium that stores data for a short moment such as a register, a cache, a memory and the like, but a medium that stores data semi-permanently and which is readable by an apparatus. For example, programs for performing the above-described various methods can be stored in a non-transitory computer readable medium such as a CD, a DVD, a hard-drive disk (HDD), a solid state disk (SSD), a Blu-ray disk, a universal serial bus (USB), a memory card, ROM, or the like, and can be provided.

Although various examples of the disclosure have been illustrated and described hereinabove, the disclosure is not limited to the above-mentioned examples, but may be variously modified by those skilled in the art to which the disclosure pertains without departing from the scope and spirit of the disclosure as set forth in the accompanying claims. These modifications should also be understood to fall within the scope of the disclosure.

What is claimed is:

1. An image forming apparatus comprising:
   a memory,
   a communication device;
   a print engine to form an image; and
   a processor to, based on a first event in the image forming apparatus:
   generate first log data regarding the first event,
   store the first log data in the memory,
   generate first integrity inspection data regarding the first log data,
   generate a first signature value regarding the first integrity inspection data, and
   control the communication device to transmit the first log data, the first integrity inspection data, and the first signature value to a server device,
   receive response information from the server device,
   responsive to the response information indicating a completion of a reception regarding the first log data at the server device, delete the first log data from the memory.

2. The image forming apparatus of claim 1, wherein the processor is to:
- generate second integrity inspection data regarding second log data generated before the first log data, and a second signature value regarding the first integrity inspection data, and
- control the communication device to transmit the second integrity inspection data and the second signature value to the server device.

3. The image forming apparatus of claim 1, wherein the first log data includes an event message with information on the first event and identification information of the image forming apparatus, and further includes a sequence number, a server identifier, or time information.

4. The image forming apparatus of claim 1, wherein the first event comprises a user authentication event, and the first log data is regarding the user authentication event.

5. The image forming apparatus of claim 1,
- wherein the response information includes response data and a second signature value regarding the response data, and
- wherein the processor is to confirm whether the response data is modulated using the second signature value included in the response information.

6. The image forming apparatus of claim 1, wherein the processor is to control the communication device to re-transmit the first integrity inspection data and the first signature value based on receiving response information indicating a reception failure, or based on response information not being received for a predetermined time.

7. The image forming apparatus of claim 1, wherein the processor is to restrict an operation of the print engine based on receiving response information indicating a reception failure, or based on response information not being received for a predetermined time.

8. The image forming apparatus of claim 1, wherein the processor is to control the communication device to transmit the first integrity inspection data and the first signature value to each of a plurality of server devices.

9. The image forming apparatus of claim 8, wherein the server device from which the response information is received is one of the plurality of server devices.

10. The image forming apparatus of claim 8, wherein the processor is to control the communication device to transmit access address information regarding the plurality of server devices to each of the plurality of server devices.

11. A method of an image forming apparatus, the method comprising:
- based on a first event in the image forming apparatus, generating first log data regarding the first event;
- generating first integrity inspection data regarding the first log data;
- generating a first signature value regarding the first integrity inspection data;
- generating second integrity inspection data regarding second log data generated before the first log data;
- generating a second signature value regarding the first integrity inspection data; and
- transmitting, to a server device, the first log data, the first integrity inspection data, the first signature value, the second integrity inspection data, and the second signature value.

12. The method of claim 11, further comprising:
- re-transmitting the first integrity inspection data and the first signature value based on receiving response information indicating a reception failure, or based on response information being not received for a predetermined time.

13. The method of claim 11, further comprising:
- storing the first log data in a memory; and
- based on response information indicating a completion of a reception regarding the first log data at the server device, deleting the first log data from the memory.

14. The method of claim 11, wherein the transmitting comprises transmitting the first integrity inspection data and the first signature value to each of a plurality of server devices.

15. A non-transitory computer readable medium comprising instructions that upon execution cause an image forming apparatus to:
- based on a first event in the image forming apparatus, generate log data regarding the first event;
- generate first integrity inspection data regarding the log data;
- generate a first signature value regarding the first integrity inspection data;
- transmit the log data, the first integrity inspection data, and the first signature value to a server device;
- re-transmit, from the image forming apparatus to the server device, the first integrity inspection data and the first signature value responsive to:
  - response information from the server device indicating a reception failure of the log data, or
  - response information being not received at the image forming apparatus for a predetermined time.

16. The image forming apparatus of claim 1, wherein the first event comprises a change in a security setting, and the first log data is regarding the change in the security setting.

17. The method of claim 11, wherein the transmitting comprises transmitting a concatenation of the first log data, the first integrity inspection data, the first signature value, the second integrity inspection data, and the second signature value.

18. The non-transitory computer readable medium of claim 15, wherein the first event comprises a user authentication event, and the log data is regarding the user authentication event.

19. The non-transitory computer readable medium of claim 15, wherein the first event comprises a change in a security setting, and the log data is regarding the change in the security setting.

* * * * *